US011002306B2

(12) United States Patent
Stewart

(10) Patent No.: US 11,002,306 B2
(45) Date of Patent: May 11, 2021

(54) SACRIFICIAL WASHER AND RELATED COMPONENTS

(71) Applicants: Robert E. Stewart, Farmington Hills, MI (US); Nicholas Strumbos, Birmingham, MI (US)

(72) Inventor: Robert E. Stewart, Farmington Hills, MI (US)

(73) Assignees: Robert E. Stewart, Farmington Hills, MI (US); Nicholas Strumbos, Birmingham, MI (US)

( * ) Notice: Subject to any disclaimer, the term of this patent is extended or adjusted under 35 U.S.C. 154(b) by 216 days.

(21) Appl. No.: 16/142,417

(22) Filed: Sep. 26, 2018

(65) Prior Publication Data
US 2019/0101150 A1 Apr. 4, 2019

Related U.S. Application Data

(60) Provisional application No. 62/566,401, filed on Sep. 30, 2017.

(51) Int. Cl.
*F16B 31/02* (2006.01)
*F16B 43/00* (2006.01)
*F41H 5/013* (2006.01)
*F16B 31/00* (2006.01)

(52) U.S. Cl.
CPC ............ *F16B 31/028* (2013.01); *F16B 43/00* (2013.01); *F16B 31/005* (2013.01); *F41H 5/013* (2013.01)

(58) Field of Classification Search
CPC ...... F16B 43/00; F16B 31/028; F16B 5/0241; F16B 31/005; F41H 5/013

USPC .................................................. 411/544, 531
See application file for complete search history.

(56) References Cited

U.S. PATENT DOCUMENTS

| | | | | |
|---|---|---|---|---|
| 128,602 A | * | 7/1872 | Dittman | F16B 39/24 411/150 |
| 2,339,549 A | * | 1/1944 | Kubaugh | F16B 43/00 411/544 |
| 2,960,902 A | * | 11/1960 | De Caro | F16B 4/002 411/440 |
| 3,170,365 A | | 2/1965 | Vaughn | |
| 3,216,475 A | | 11/1965 | Jacobsen | |
| 3,435,724 A | | 4/1969 | Trungolo | |

(Continued)

FOREIGN PATENT DOCUMENTS

| | | |
|---|---|---|
| GB | 1493558 | 11/1977 |
| GB | 2326921 | 1/1999 |

OTHER PUBLICATIONS

Klann, et al.; "An Experimental Evaluation of Composite Enclosures for Explosive Reactive Armor"; 29th International Symposium on Ballistics; May 2016; pp. 1860-1871.

(Continued)

*Primary Examiner* — Flemming Saether
(74) *Attorney, Agent, or Firm* — Reising Ethington P.C.

(57) ABSTRACT

A sacrificial washer has a longitudinal central axis and comprises a cup and a cap. The cup includes a cup base wall extending transversely with respect to the axis, a cup radially outer wall extending outwardly away from the cup base wall, and a cup inner diameter. The cup includes a cap base wall extending transversely with respect to the axis and spaced axially away from the cup base wall, and a cap radially inner wall extending inwardly away from the cap base wall and having a cap inner diameter.

22 Claims, 6 Drawing Sheets

(56) References Cited

U.S. PATENT DOCUMENTS

| | | | | |
|---|---|---|---|---|
| 3,604,306 A | * | 9/1971 | Denholm | F16M 7/00 |
| | | | | 411/535 |
| 3,912,206 A | * | 10/1975 | Jong | B64D 11/04 |
| | | | | 248/615 |
| 4,061,073 A | | 12/1977 | Easter et al. | |
| 4,182,189 A | | 1/1980 | Dock et al. | |
| 6,227,784 B1 | * | 5/2001 | Antoine | F02B 77/00 |
| | | | | 411/11 |
| 8,607,577 B2 | * | 12/2013 | Ruberte Sanchez | F23R 3/60 |
| | | | | 60/796 |
| 9,551,456 B2 | * | 1/2017 | Peters | F16F 15/04 |
| 9,587,664 B2 | * | 3/2017 | Bisset | F16B 41/002 |
| 9,616,932 B2 | | 4/2017 | Nusier et al. | |
| 9,689,417 B2 | | 6/2017 | Stewart | |

OTHER PUBLICATIONS

Klann, et al.; "An Experimental Study Invenstigating the Response of Bolts to Ballistic Events", 29th Internation Symposium on Ballistics; May 2016; pp. 1039-1049.

* cited by examiner

SACRIFICIAL WASHER AND RELATED COMPONENTS

TECHNICAL FIELD

This disclosure relates generally to fastening systems and, more particularly, to washers and components thereof.

BACKGROUND

An example of a simple fastening system includes a bolt having a shank with a head having flats for engagement by a wrench, and a shank extending from the head through a passage in a cup and having external threads threaded into a threaded passage of a cap to mount the cup to the cap. Such systems often also include an annular washer circumscribing the bolt shank and axially trapped between the bolt head and a surface of the cup. Typically, washers are disc-shaped with a central hole, of unitary construction, and of flat, toothed, conical, helical, or wave shapes. Washers typically are used to distribute a fastening clamp load, prevent damage to a component surface, prevent galvanic corrosion between dissimilar metals, prevent loosening from vibration or thermal cycling, or reduce vibration.

Such systems are ancient, and work very well for many applications. But in other applications, an area of fastener clamp loading is too small to prevent loosening of the system due to vibration or thermal cycling. And some applications are subjected to forces so sudden and so great that the fasteners plastically stretch, fracture, or otherwise fail, thereby potentially resulting in separation of the fastened components. In a non-limiting example, systems for mounting and fastening ballistics deterrent equipment on armored-vehicles are subjected to wide range dynamic forces from ballistic events from bullets, rocket-propelled grenades, projectiles from mines and improvised explosive devices, and other ballistic projectiles. Such forces can compromise the integrity of the fasteners, such that the fasteners fail to constrain the ballistics deterrent equipment and may expose an armored-vehicle to complete penetration from subsequent ballistic projectiles.

Traditional solutions to such problems include increasing the size, quantity, and/or material quality of the fasteners. But such solutions may result in designs that are too costly, too heavy, too unreliable, or otherwise insufficient.

SUMMARY OF THE DISCLOSURE

In accordance with an embodiment of the present disclosure, a sacrificial washer has a longitudinal central axis and comprises a cup and a cap. The cup includes a cup base wall extending transversely with respect to the axis, a cup radially outer wall extending outwardly away from the cup base wall, and a cup inner diameter. The cup includes a cap base wall extending transversely with respect to the axis and spaced axially away from the cup base wall, and a cap radially inner wall extending inwardly away from the cap base wall and having a cap inner diameter.

DETAILED DESCRIPTION

In general, a washer and washer components will be described using one or more examples of illustrative embodiments of the assembly and components in conjunction with a bolt for sacrificial use in an illustrative environment: an armor mounting and fastening system. However, it will be appreciated as the description proceeds that the disclosed inventions are useful in many different applications and may be implemented in many other embodiments. As used herein, the term "may" is an expedient merely to indicate optionality, for instance, of an element, feature, or other thing, and cannot be reasonably interpreted or construed as rendering indefinite any disclosure herein.

Figure 1:
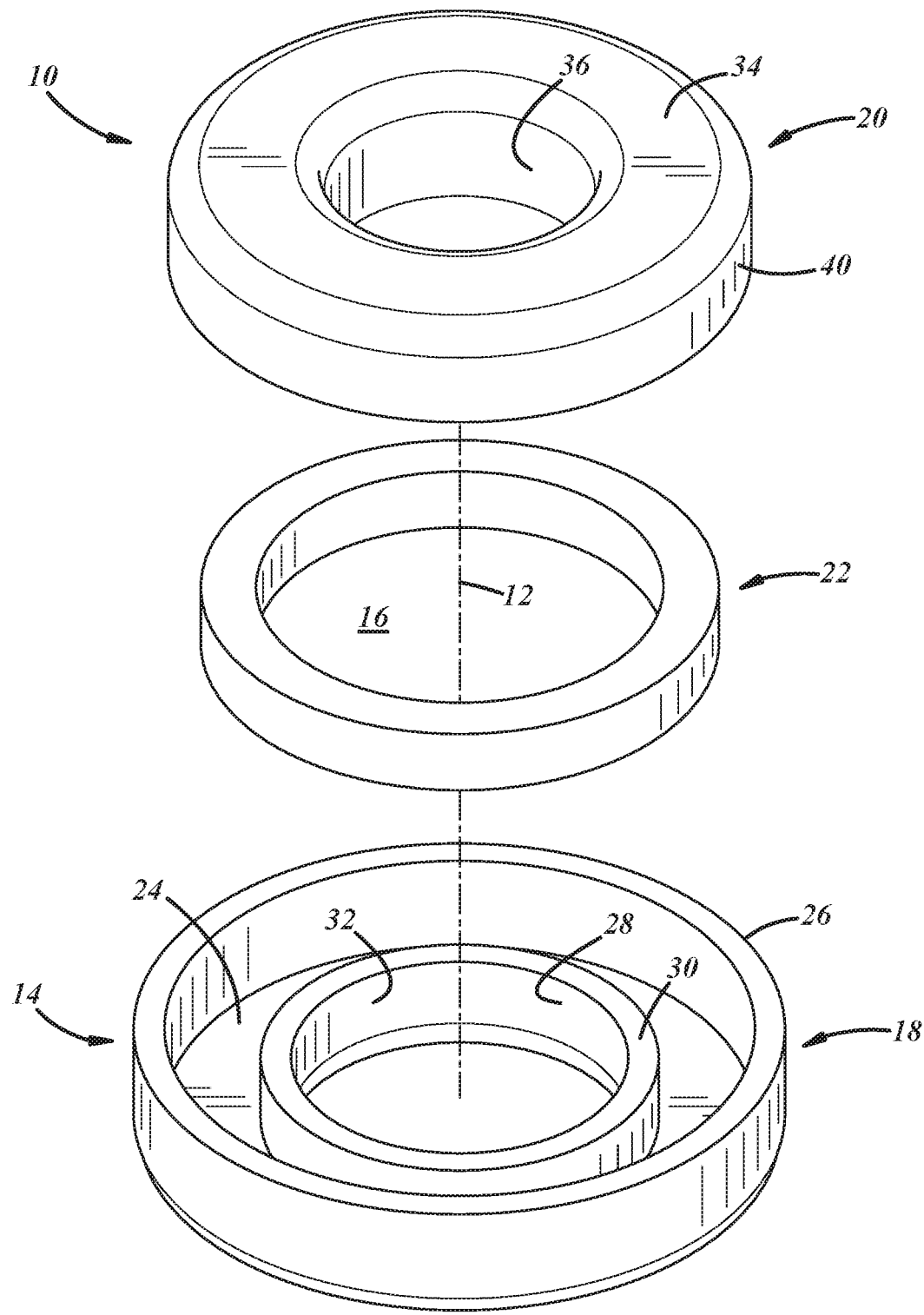
FIG. 1 is an exploded perspective view according to an illustrative embodiment of a washer.
Figure 2:
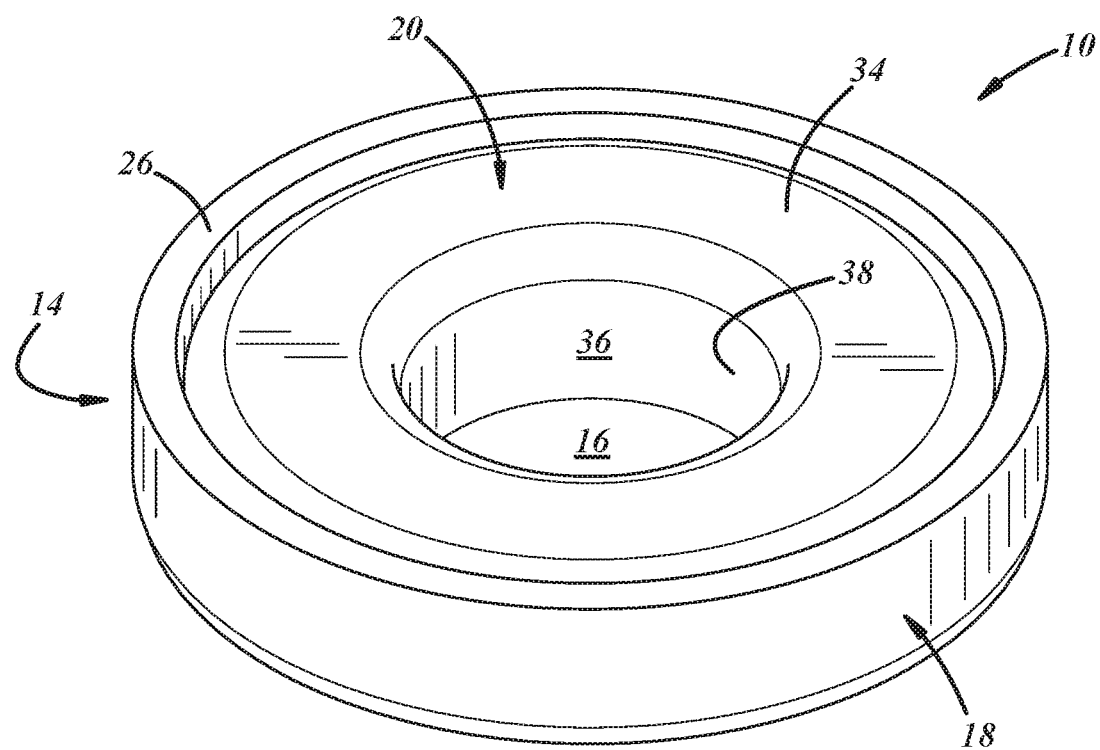
FIG. 2 is another perspective view of the washer of FIG. 1.
Figure 3:
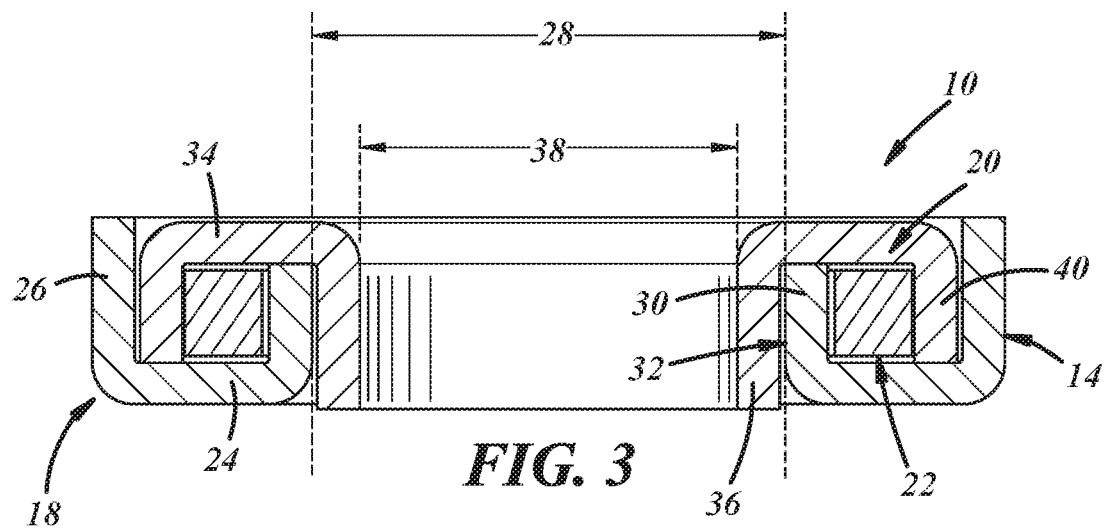
FIG. 3 is a cross-section of the washer of FIG. 1, taken from line 3-3 of FIG. 2.

Referring specifically to the drawings, FIGS. 1-3 illustrate an illustrative embodiment of a sacrificial washer 10 having a longitudinal central axis 12, a radially outer periphery 14, and a passage 16. The washer 10 includes a first component, outer shell, or cup 18, and a second component, inner shell, or cap 20 coupled to the cup 18. In the illustrated embodiments, the cup 18 is shown as a lower component and the cap 20 is shown as an upper component. But in other embodiments, the cap 20 could be the lower component and the cup 18 could be the upper component. Accordingly, the washer 10 may take on any suitable positioning and orientation. The washer 10 also may include a reactor 22 disposed between the cap 20 and the cup 18 to react to loads during use of the washer 10 after the washer 10 has been compressed against some other component (not shown) by a fastener (not shown) that may extend through the passage 16, for instance, a bolt or other like fastener. In other embodiments, the washer 10 may be carried by a shaft, peg, or the like and compressed between different surfaces.

The washer 10 may include an outer diameter of 20 mm to 40 mm, including all ranges, sub-ranges, endpoints, and values in that range. Likewise, the washer 10 may include an axial thickness of 1 mm to 3.5 mm, including all ranges, sub-ranges, endpoints, and values in that range. Accordingly, a ratio of the outer diameter to the thickness may be 40:1 to 5.7:1, including all ranges, sub-ranges, endpoints, and values in that range.

The cup 18 may be of unitary construction, and may be composed of metal, for instance, steel, aluminum, titanium, copper, or any other metal suitable for use in a washer. The cup 18 includes a cup base wall 24 extending transversely with respect to the axis 12, a cup radially outer wall 26 extending outwardly away from the cup base wall 24, and a cup inner diameter 28. As used herein, the terminology "transverse" may include perpendicular, as exemplified in FIGS. 1-3, or otherwise acutely or obtusely disposed at any suitable non-zero angle. In the present embodiment, the cup 18 also includes a radially inner wall 30 that is circumferentially continuous and that has a radially inner surface 32 establishing the cup inner diameter 28, and the cup radially outer wall 26 is circumferentially continuous.

The cap 20 may be of unitary construction, and may be composed of metal, for instance, steel, aluminum, titanium, copper, or any other metal suitable for use in a washer. The cap 20 includes a cap base wall 34 extending transversely with respect to the axis 12 and spaced axially away from the cup base wall 24, and a cap radially inner wall 36 extending inwardly away from the cap base wall 34 and having a cap inner diameter 38 less than the cup inner diameter 28. In the present embodiment, the cap radially inner wall 36 is circumferentially continuous, and the cap 20 also has a radially outer wall 40 that extends away from the cap base wall 34 and that is circumferentially continuous.

The reactor 22 may be of unitary construction, and may be composed of a material different from that of at least one of the cup 18 or the cap 20. For example, the reactor 22 may be composed of a polymeric material, for instance, nylon, rubber, plastic, silicone, or the like, or of a metallic material, for instance, a steel mesh, or ballistic gel, explosive charges, foams, composites, or any other suitable material.

In an embodiment, the washer 10 may be constructed of separate components, wherein the cup 18 and the cap 20 are separately manufactured and then assembled. In such an embodiment, the components may be loose such that the components may be pulled apart by hand, or the washer may not be loose, wherein two or more of the components may be coupled to one another. For example, corresponding portions of the cap 20 and the cup 18 may be coupled together, for example, welded, brazed, fastened, adhered, integrally engaged or interengaged, interference fit, or coupled in any other suitable manner. In another embodiment, the washer 10 may be constructed of a single component, for instance, via additive manufacturing techniques, or by selective material removal.

In general, the washer 10 can be manufactured according to techniques known to those skilled in the art, including molding, machining, stamping, forging, additive manufacturing, and the like. Also, the washer 10 can be assembled manually, and/or automatically, according to known techniques. Likewise, any suitable materials can be used in making the components, such as metals, metallic materials, composites, polymeric materials, and the like.

In an example of use, a bolt (not show) and the washer 10 carried by the bolt may be inserted through a hole in an armor panel (not shown) and threaded into a threaded hole in an armored vehicle (not shown), and may be tightened thereto with the washer 10 pressing against the armor panel. The amount of clamp load generated to retain the armor panel will be variable, but the washer 10 is adapted to collapse a controlled distance when an applied load from a ballistic event reaches the known yield point for the bolt. The washer 10 will allow forces from the ballistic event to stretch the bolt shank a restricted amount but will sacrificially crush to dissipate excess tension in the bolt. This controlled release of peak energy will prevent bolt fracture failure. Depending on the particular application, and the size, geometry, and material qualities of the washer 10, it is believed that the washer 10 can axially collapse, for example, ¼" to ½", and possibly more.

Figure 4:
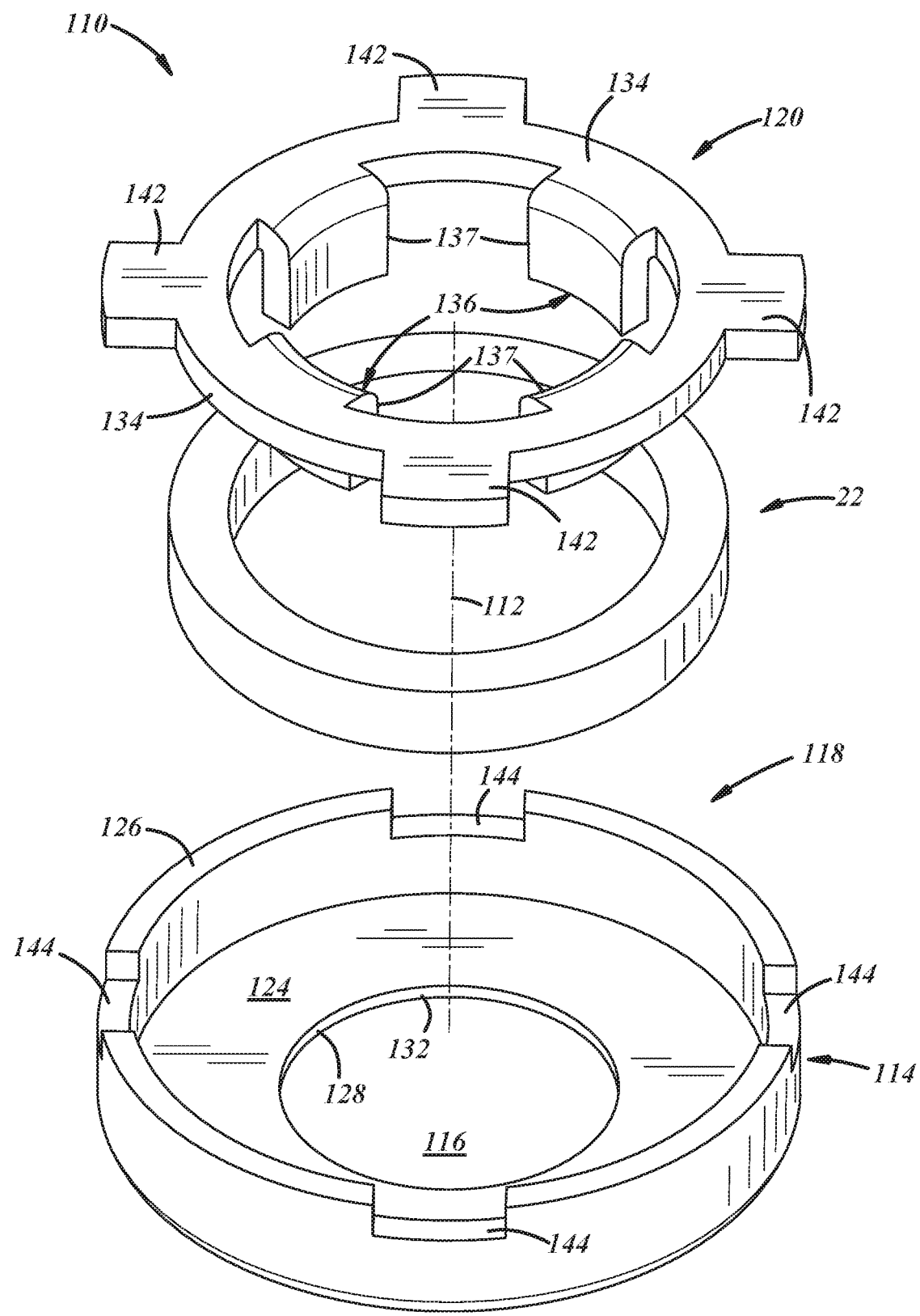
FIG. 4 is an exploded perspective view according to another illustrative embodiment of a washer.
Figure 5:
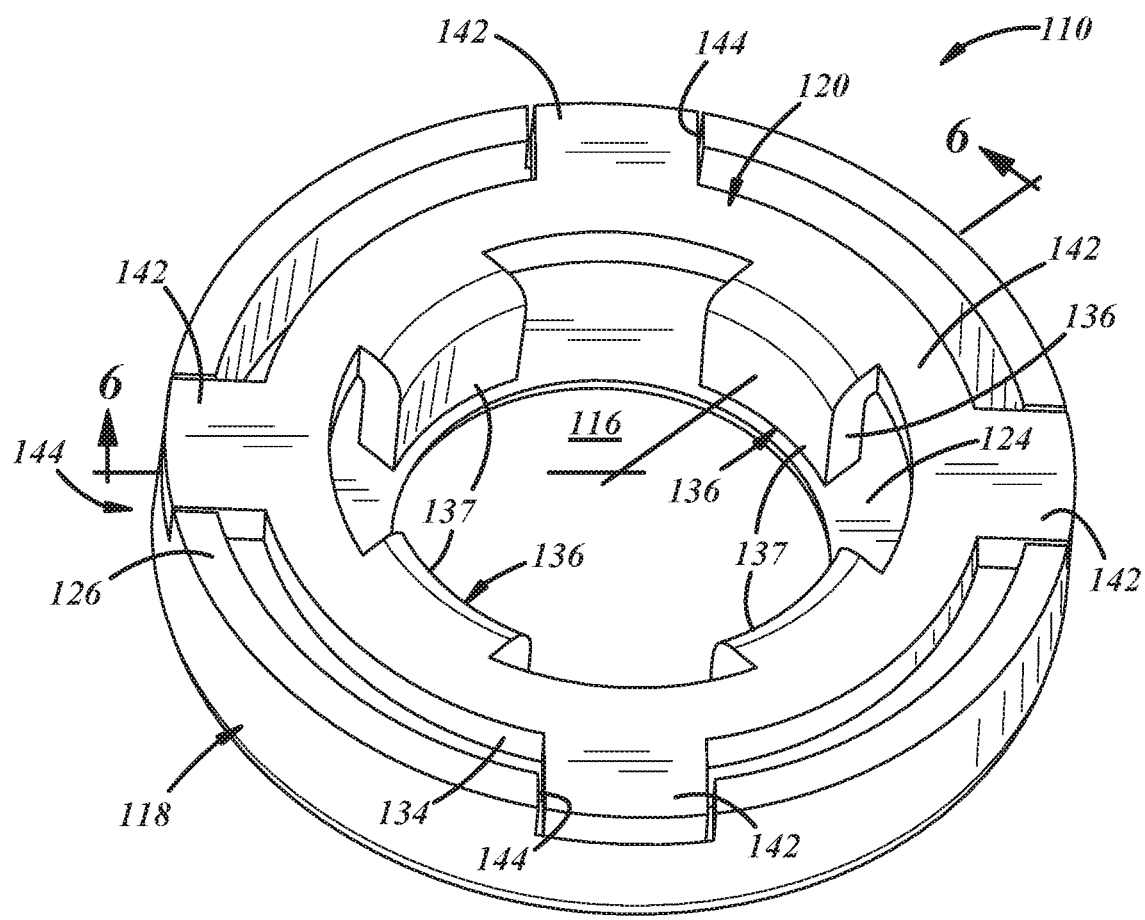
FIG. 5 is another perspective view of the washer of FIG. 4.
Figure 6:
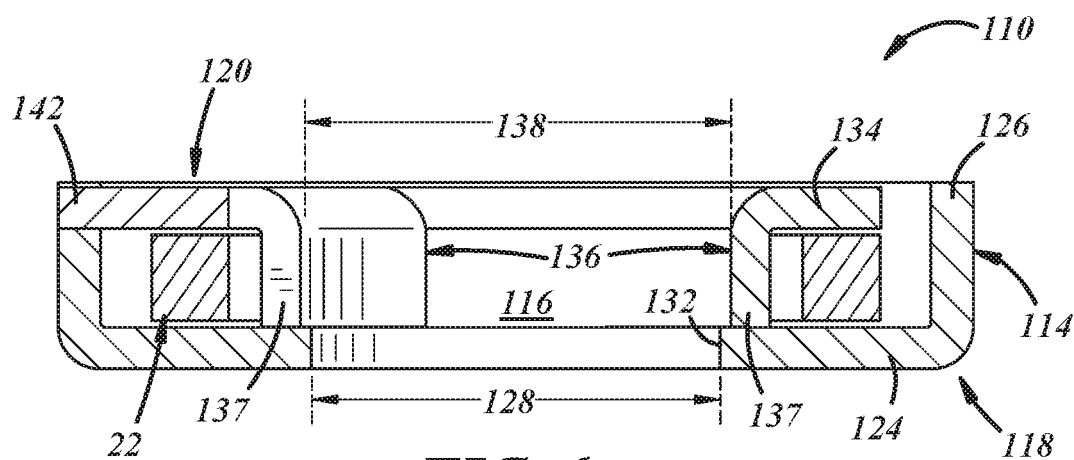
FIG. 6 is a cross-section of the washer of FIG. 4, taken from line 6-6 of FIG. 5.

FIGS. 4-6 illustrate another illustrative embodiment of a washer 110. This embodiment is similar in many respects to the embodiment of FIGS. 1-3 and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

The washer 110 includes a longitudinal central axis 112, a radially outer periphery 114, and a passage 116. The washer also includes a cup 118, and a cap 120 coupled to the cup 118. Although not shown in this embodiment, the washer 110 also may include a reactor of suitable shape to be coupled between the cap 120 and the cup 118.

Here, the cup 118 has a cup base wall 124 that establishes the cup inner diameter 128. Also, the cap 120 includes a plurality of arms 142 extending radially outwardly from a cap base wall 134. Accordingly, the cup 118 has a radially outer wall 126 that includes a plurality of pockets 144 to accept the plurality of arms 142 of the cap 120. The pockets 144 may be provided in a free end of the outer wall 126.

The cap 120 also includes a cap radially inner wall 136 extending inwardly away from the cap base wall 134 and having a cap inner diameter 138 greater than the cup inner diameter 128. In the present embodiment, the cap radially inner wall 136 is circumferentially discontinuous with at least two circumferentially spaced apart legs 137. In another embodiment, there are at least three legs 137. In the illustrated embodiment, there are four legs 137, but there may be more than four legs.

Figure 7:
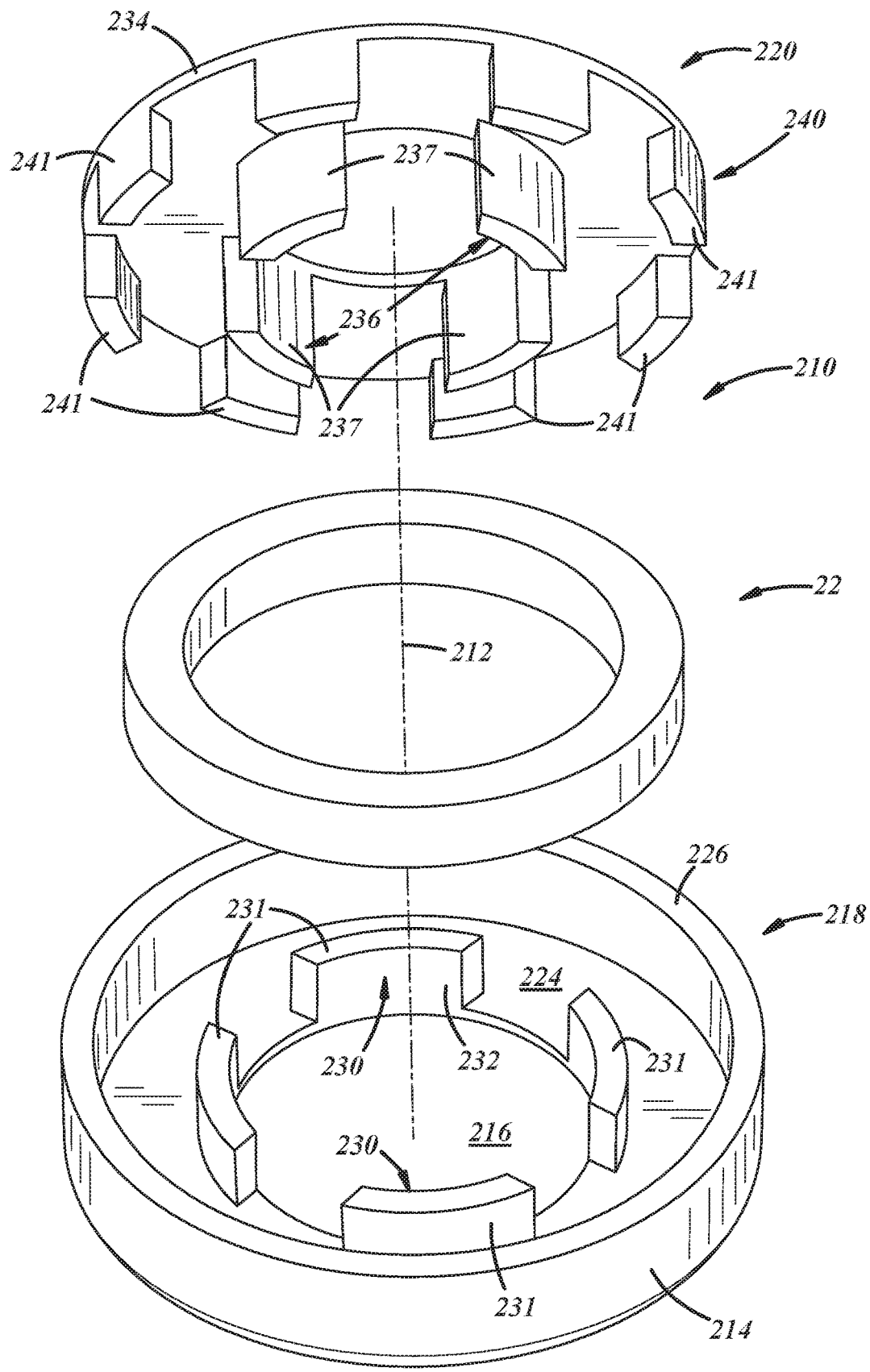
FIG. 7 is an exploded perspective view according to a further illustrative embodiment of a washer.
Figure 8:
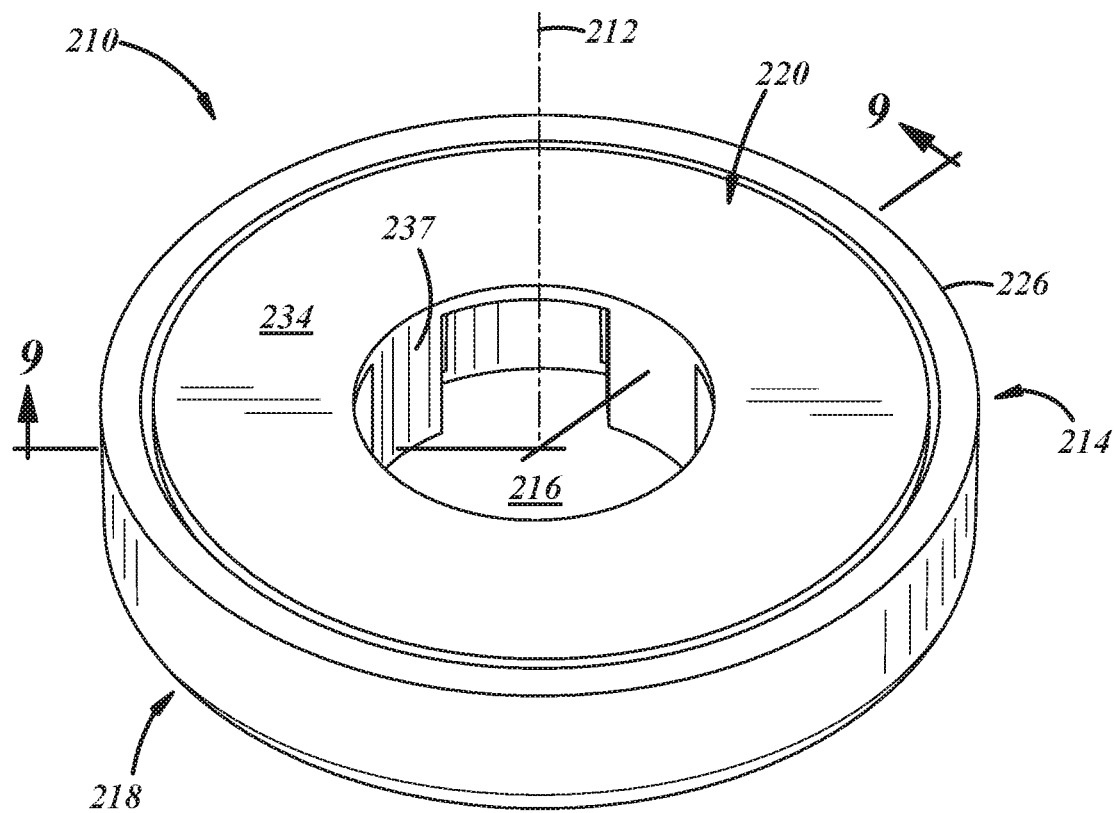
FIG. 8 is another perspective view of the washer of FIG. 7.
Figure 9:
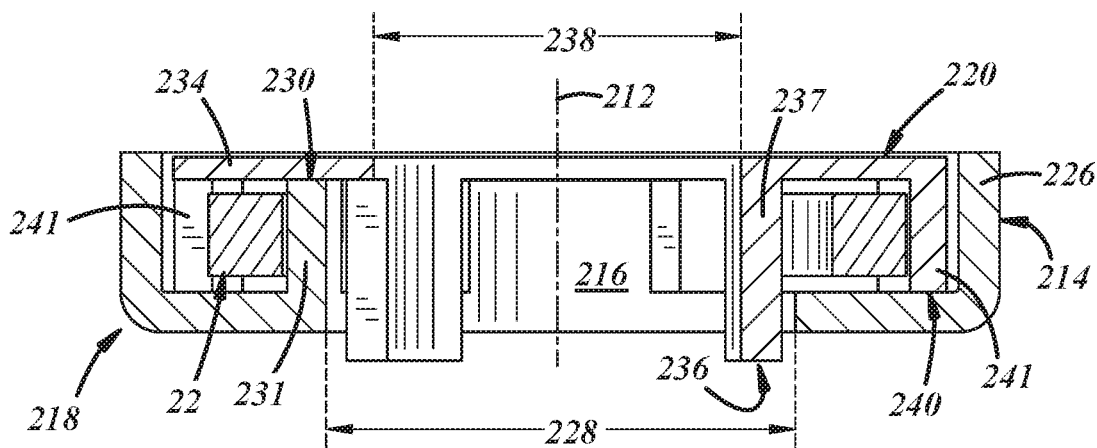
FIG. 9 is a cross-section of the washer of FIG. 7, taken from line 9-9 of FIG. 8.

FIGS. 7-9 illustrate another illustrative embodiment of a washer 210. This embodiment is similar in many respects to the embodiment of FIGS. 1-6 and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

The washer 210 includes a longitudinal central axis 212, a radially outer periphery 214, and a passage 216. The washer also includes a cup 218, and a cap 220 coupled to the cup 218. Although not shown in this embodiment, the washer 210 also may include a reactor of suitable shape to be coupled between the cap 220 and the cup 218.

The cup 218 includes a cup base wall 224 extending transversely with respect to the axis 212, a cup radially outer wall 226 that is circumferentially continuous and extending outwardly away from the cup base wall 224, and a cup inner diameter 228. In the present embodiment, the cup 218 also includes a radially inner wall 230 that has a radially inner surface 232 establishing the cup inner diameter 228. In the present embodiment, the cup radially inner wall 230 is circumferentially discontinuous with at least two circumferentially spaced apart legs 231. In another embodiment, there are at least three legs 231. In the illustrated embodiment, there are four legs 231, but there may be more than four legs.

Here, the cap 220 includes a radially inner wall 236 that is circumferentially discontinuous with at least two circumferentially spaced apart inner legs 237. In the illustrated embodiment, the inner legs 237 include four inner legs 237, but may include three or more inner legs 237. Likewise, the cap 220 includes a radially outer wall 240 that is circumferentially discontinuous with at least two circumferentially spaced apart outer legs 241. In the illustrated embodiment, the outer legs 241 include eight legs 241, but may include two or more legs 241.

The inside diameter 238 of the legs 236 may be manufactured very close to an outside diameter of a corresponding bolt shank, for instance, for a slip or clearance fit therebetween. An outside diameter of the legs 236 may be equal to or less than a corresponding hole in a component into which the corresponding bolt slides while carrying the washer 210. Accordingly, lower ends of the legs 237 will enter a clearance between the bolt shank and the corresponding hole in the component. Thus, the legs 237 serve to pilot or center the sacrificial washer 210 and its corresponding bolt precisely to the hole in the component. Accordingly, during a ballistic event, the legs 237 will be displaced so as to slide straight down the clearance between the bolt and the hole in the component. This configuration serves to prevent shifting of the sacrificial washer 210 relative to the bolt shank, wherein such shifting could cause an off-center collapse of the washer 210. So, by guiding the sacrificial washer 210 in the aforementioned manner, to collapse straight down in a controlled and directed manner, uniform compression around the perimeter of the washer is assured for a consistent and repeatable compression load response of the washer 210 for higher accuracy performance.

The quantity, size, and material qualities of the walls/legs of the presently disclosed washers can be varied to achieve a desired level of washer strength that allows a bolted/washered joint to hold securely under design intent operation absent significant ballistic events and, yet, allows washer collapse during significant ballistic events. The washers will collapse during ballistic events having magnitude and direction significant enough to cause collapse of the washers. During such significant ballistic events, at least one or more of the walls/legs of the washers will deform to release excess tension that otherwise would be applied to bolt shanks associated with the washers during such significant ballistic events. During significant ballistic events, as the bolt shank stretches and tension builds toward a yield point of the bolt, the walls/legs bend, fold, or otherwise deform to allow joint tension to be released and stresses on the bolt shank to be relieved.

Also, the height of the walls/legs can be adjusted to allow a defined distance of collapse. For example, if destructive impact testing during significant ballistic events indicates that a ¼" of release distance is necessary to protect a bolted joint, then the height of the walls/legs of the sacrificial washer can be shortened or lengthened to achieve that specification.

Additionally, the shape of the walls/legs can be adjusted to direct the magnitude and direction of collapse of the walls/legs. For example, ends of the legs can be provided with angled surfaces to direct the legs to fold inward or outward. Accordingly, wall/leg shape can influence how the walls/legs collapse to achieve complete strain relief of the bolt and to control the speed of that strain release.

In any event, the presently disclosed washers 10, 110, 210 are plastically deformable, crushable, and/or collapsible during significant ballistic events so as to be sacrificed to preserve the integrity of the joint, mounting system, and/or fastening system with which it is associated. Of course, once the washers 10, 110, 210 are sacrificed, they can be removed and replaced with new sacrificial washers 10, 110, 210.

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application, but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Therefore, the claimed invention is not limited to the particular examples of illustrative embodiments disclosed herein but, instead, is defined by the accompanying claims.

The invention claimed is:

1. A sacrificial washer having a longitudinal central axis, comprising:
   a cup including:
      a cup base wall extending transversely with respect to the axis,
      a cup radially outer wall extending outwardly away from the cup base wall, and
      a cup inner diameter;
   a cap including:
      a cap base wall extending transversely with respect to the axis and spaced axially away from the cup base wall, and
      a cap radially inner wall extending inwardly away from the cap base wall and having a cap inner diameter and being circumferentially discontinuous with at least two circumferentially spaced apart legs; and
   a reactor carried between the cup and cap, wherein the reactor is composed of at least one of a ballistics gel or explosive charge.

2. The sacrificial washer of claim 1, wherein the legs include at least three legs.

3. The sacrificial washer of claim 1, wherein the cup also includes a radially inner wall.

4. The sacrificial washer of claim 3, wherein the cup radially inner wall is circumferentially continuous.

5. The sacrificial washer of claim 3, wherein the cup radially inner wall is circumferentially discontinuous with at least two circumferentially spaced apart legs.

6. The sacrificial washer of claim 5, wherein the legs include at least three legs.

7. The sacrificial washer of claim 3, wherein the cup radially inner wall has a radially inner surface establishing the cup inner diameter.

8. The sacrificial washer of claim 1, wherein the cup base wall establishes the cup inner diameter.

9. The sacrificial washer of claim 1, wherein the cup radially outer wall is circumferentially continuous.

10. The sacrificial washer of claim 1, wherein the cap has a radially outer wall extending away from the cap base wall.

11. The sacrificial washer of claim 10, wherein the cap radially outer wall is circumferentially discontinuous with at least two circumferentially spaced apart legs.

12. The sacrificial washer of claim 11, wherein the legs include at least three legs.

13. The sacrificial washer of claim 1, wherein the cup also includes a cup radially inner wall extending inwardly away from the cup base wall, and the cap also includes a cap radially outer wall extending inwardly away from the cap base wall and having a cap outer diameter less than an inner diameter of the radially outer wall of the cup.

14. A sacrificial washer having a longitudinal central axis, comprising:
    a cup including:
        a cup base wall extending transversely with respect to the axis,
        a cup radially outer wall extending outwardly away from the cup base wall, and
        a cup inner diameter; and
    a cap including:
        a cap base wall extending transversely with respect to the axis and spaced axially away from the cup base wall, and
        a cap radially inner wall extending inwardly away from the cap base wall and having a cap inner diameter; and
    a reactor carried between the cup and cap, wherein the reactor is composed of at least one of a ballistics gel or explosive charge,
    wherein the cap also includes a plurality of arms extending radially outwardly from the cap base wall.

15. The sacrificial washer of claim 14, wherein the cup radially outer wall includes a plurality of pockets to accept the plurality of arms of the cap.

16. A sacrificial washer having a longitudinal central axis, comprising:
    a cup including:
        a cup base wall extending transversely with respect to the axis,
        a cup radially outer wall extending outwardly away from the cup base wall, and
        a cup inner diameter; and
    a cap including:
        a cap base wall extending transversely with respect to the axis and spaced axially away from the cup base wall, and
        a cap radially inner wall extending inwardly away from the cap base wall and having a cap inner diameter; and
    a reactor carried between the cup and cap, wherein the reactor is composed of at least one of a ballistics gel or explosive charge,
    wherein the cap radially inner wall is circumferentially discontinuous to establish at least two circumferentially spaced legs.

17. The sacrificial washer of claim 16, wherein the cup also includes a radially inner wall extending outwardly away from the cup base wall.

18. The sacrificial washer of claim 16, wherein the cap also includes a radially outer wall extending inwardly from the cap base wall.

19. A sacrificial washer having a longitudinal central axis, comprising:
    a cup including:
        a cup base wall extending transversely with respect to the axis,
        a cup radially outer wall extending outwardly away from the cup base wall and including a plurality of pockets, and
        a cup inner diameter; and
    a cap including:
        a cap base wall extending transversely with respect to the axis and spaced axially away from the cup base wall,
        a plurality of arms extending radially outwardly from the cap base wall and carried in the plurality of pockets of the cup radially outer wall, and
        a cap radially inner wall extending inwardly away from the cap base wall and having a cap inner diameter, wherein the cap radially inner wall is circumferentially discontinuous with at least two circumferentially spaced apart legs.

20. The sacrificial washer of claim 19, wherein the cap inner diameter is larger than the cup inner diameter.

21. The sacrificial washer of claim 19, wherein the arms of the cap are configured to contact the cup radially outer wall and the legs of the cap are configured to contact the cup base wall.

22. The sacrificial washer of claim 19, further comprising a reactor carried axially between the cup and cap base walls and radially cup radially outer wall and the cap legs.

* * * * *